(12) United States Patent
Muhlhoff et al.

(10) Patent No.: US 11,926,178 B2
(45) Date of Patent: Mar. 12, 2024

(54) TIRE COMPRISING A TEXTURED TREAD

(71) Applicant: COMPAGNIE GENERALE DES ETABLISSEMENTS MICHELIN, Clermont-Ferrand (FR)

(72) Inventors: Olivier Muhlhoff, Clermont-Ferrand (FR); Hélène Emorine, Clermont-Ferrand (FR); Arnaud Larregain, Clermont-Ferrand (FR); Nicolas Levy, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 1165 days.

(21) Appl. No.: 15/563,092

(22) PCT Filed: Mar. 25, 2016

(86) PCT No.: PCT/FR2016/050683
§ 371 (c)(1),
(2) Date: Sep. 29, 2017

(87) PCT Pub. No.: WO2016/156718
PCT Pub. Date: Oct. 6, 2016

(65) Prior Publication Data
US 2018/0072107 A1  Mar. 15, 2018

(30) Foreign Application Priority Data

Mar. 30, 2015  (FR) ...................................... 1500628

(51) Int. Cl.
*B60C 11/13*     (2006.01)
*B60C 11/24*     (2006.01)

(52) U.S. Cl.
CPC .......... *B60C 11/1353* (2013.01); *B60C 11/24* (2013.01); *B60C 2011/1361* (2013.01)

(58) Field of Classification Search
CPC ................. B60C 11/1353; B60C 11/24; B60C 2011/1361
See application file for complete search history.

(56) References Cited

U.S. PATENT DOCUMENTS 4,198,774 A  *  4/1980  Roberts ................. B60C 13/001
                                                           152/523
6,253,815 B1 *  7/2001  Kemp ...................... B44F 1/02
                                                           152/523

(Continued)

FOREIGN PATENT DOCUMENTS

CN       101291786      10/2008
CN       101479117       8/2009

(Continued)

OTHER PUBLICATIONS

Machine translation of JP06-099705 (no date).*
Machine translation of JP08-258517 (no date).*

*Primary Examiner* — Justin R Fischer
*Assistant Examiner* — Philip N Schwartz
(74) *Attorney, Agent, or Firm* — Cozen O'Connor

(57) ABSTRACT

Tire (1) comprising a tread (8), the tire comprising at least one groove (2), at least one wear indicator (3) disposed in the groove (2), the wear indicator comprising a contact face (7) intended to come into contact with a roadway when the tire reaches a wear limit, the groove (2) comprising a texture (4) produced integrally with a bottom (10) of this groove (2), said texture (4) surrounding the wear indicator (3) and contrasting with the contact face (7) of the wear indicator.

10 Claims, 3 Drawing Sheets

(56) References Cited

U.S. PATENT DOCUMENTS

| | | |
|---|---|---|
| 6,866,076 B2 | 3/2005 | Ohsawa |
| 2009/0218019 A1 | 9/2009 | Paturle |
| 2012/0227879 A1* | 9/2012 | Muhlhoff ............... B60C 13/001 152/151 |
| 2013/0206291 A1 | 8/2013 | Emorine et al. |
| 2015/0246587 A1* | 9/2015 | Muhlhoff ............... B60C 13/001 152/523 |
| 2016/0121658 A1* | 5/2016 | Skurich ............... B60C 11/0309 152/209.18 |

FOREIGN PATENT DOCUMENTS

| | | | |
|---|---|---|---|
| CN | 102574430 | 7/2012 | |
| EP | 0522781 | 1/1993 | |
| EP | 1 568 514 | 8/2005 | |
| FR | 2 962 373 | 1/2012 | |
| FR | 2995254 A1 * | 3/2014 | ........... B23K 26/384 |
| JP | 06099705 A * | 4/1994 | ............. B60C 11/13 |
| JP | H06 99705 | 4/1994 | |
| JP | 08258517 A * | 10/1996 | ............. B60C 11/24 |
| JP | 2004-196145 | 7/2004 | |
| WO | WO 2007/045425 | 4/2007 | |
| WO | WO 2008/008069 | 1/2008 | |
| WO | WO 2011/036061 | 3/2011 | |

* cited by examiner

TIRE COMPRISING A TEXTURED TREAD

RELATED APPLICATIONS

This is a U.S. National Phase Application under 35 USC 371 of International Application PCT/FR2016/050683 filed on Mar. 25, 2016.

This application claims the priority of French application no. 1500628 filed Mar. 30, 2015, the entire content of which is hereby incorporated by reference.

TECHNICAL FIELD OF THE INVENTION

The present invention relates to a tire, the crown of which has a tread provided with grooves with textured zones.

PRIOR ART

In order to maintain the level of safety of a vehicle, it is appropriate to check the wear level of the tires regularly, and preferably before each long journey. To this end, the motorist studies the surface of the tread of the tires and measures the height of the tread patterns. This measurement is made easier by an element that is present on all types of tire: the weTRar indicator. The wear indicator makes it possible to evaluate the state of wear of the tires on the basis of a reliable reference. This indicator is typically disposed in the grooves of the tires. Thus, when the patterns of the tread are situated at the same height as the wear indicators (i.e., for example, in Europe, at a height of at least 1.6 millimetres with respect to the bottom of the furrow), it is necessary to replace the tire(s).

The wear indicator is fitted at the bottom of furrows and is generally in the form of a rectangle. It should be visible not only to the user but also to third parties, for example in order to make it possible to check that the wear indicators comply with legislation. Therefore, it is important to have effective and reliable visual markers to make it possible to locate the wear indicators quickly and easily. In some cases, the wear indicators of certain tires for passenger vehicles, in particular models with a low-floor chassis, are less visible since bodywork elements cover the top part of the tires. In this situation, the wear indicator becomes less visible. The user can then identify the position of the wear indicator by referring to a marker situated in the shoulder zone. Such a marker can be formed by the well-known symbol "TWI" (for "Tire Wear Indicator), or any other symbol that is easily recognizable to users.

In other cases, the grooves of the tread are entirely covered with light-absorbing textures, making it difficult, even sometimes extremely so, to locate the wear indicator.

For example, the U.S. patent application Ser. No. 6,866,076 describes a tire provided to reduce the resistance to a fluid flowing in the furrows. To this end, the tire has textures at the furrow bottoms. The furrows of the tire are covered with small grooves or small ribs that have a fixed depth in a range from 0.01 to 0.5 millimetres. Therefore, the resistance to the water flowing in the furrow is reduced. By virtue of this type of arrangement, it is possible to improve the performance of the tire, for example in a wet environment. However, with such an arrangement, the wear indicator, which is disposed among the grooves, is not very visible. Furthermore, the presence of the grooves close to the wear indicators can make the operations of checking the height of the wear indicators tricky. This is because the grooves constitute obstacles that can hamper good positioning of a measuring tool such as a ruler, a micrometer, or a calliper, and this can lead to inaccurate measurements.

The invention provides various technical means for remedying these various drawbacks.

SUMMARY OF THE INVENTION

One object of the invention is to provide a tire designed to make it possible to identify or locate tread wear indicators.

A further object of the invention is to make it easier to verify the compliance of the wear indicators with legal requirements.

Another object of the invention is to make it possible to measure the height of the wear indicators positioned in a textured sector.

To this end, one aspect of the invention provides a tire comprising a tread, the tire comprising at least one groove, at least one wear indicator disposed in the groove, the wear indicator comprising a contact face intended to come into contact with a roadway when the tire reaches a wear limit, the groove comprising a texture produced integrally with a bottom of this groove, said texture surrounding the wear indicator and contrasting with the contact face of the wear indicator.

Therefore, the textured surfaces of the grooves absorb light. By contrast, the smoother surfaces of the wear indicators allow better reflection of the light. This creates a de facto contrast between the two surfaces and makes the wear indicator(s) more visible. The user can thus identify or locate the wear indicators of his tires more easily, making it less tedious to check tire wear.

Advantageously, the texture has a lightness known as first lightness ($L^*1$) and the contact face of the wear indicator has a lightness known as second lightness ($L^*2$), the difference in lightness between the first and second lightness being at least 5 units of lightness (on a scale ranging from 0 to 100). Such a difference in lightness makes it possible to create a contrast effect that is easy for a user to find. This contrast effect can advantageously serve to locate a specific point such as a wear indicator, which is conventionally difficult to find on a tread without a contrast effect.

The first lightness ($L^*1$) is advantageously between 5 and 18 units, and preferably between 8 and 16 units. The values tend towards black so as to absorb incident light well.

The lightness of the contact face (or second lightness) is between 20 and 35 units. The values tend towards white so as to reflect incident light well.

According to an advantageous embodiment, the wear indicator comprises at least one lateral face connecting the contact face of the wear indicator to said bottom, said lateral face not having said texture. The textured lateral face helps to improve the visibility of the wear indicator in the groove.

According to another advantageous embodiment, the groove has a texture-free zone disposed between a zone provided with a texture and a lateral face of the wear indicator, said texture-free zone having a length of between 3 and 10 mm.

Such a zone advantageously serves as a measuring zone, making it easier to check the compliance of the height H of the wear indicator, for example during a step of checking on leaving the mould. The non-textured appearance of the measuring zone makes it possible to precisely and reliably check the height H of the wear indicator.

Alternatively, the texture is recessed with respect to the bottom of the groove. Such a recessed disposition reduces the risk of the flow of water being disrupted and does not disrupt the measurement of the height H of the wear indicator.

Definitions

A "tire" means all types of resilient tread, whether or not it is subjected to an internal pressure.

A "rubber material" means a diene elastomer, that is to say, in a known way, an elastomer which is based, at least partially (i.e. is a homopolymer or a copolymer), on diene monomers (monomers bearing two conjugated or non-conjugated carbon-carbon double bonds).

The "tread" of a tire means a quantity of rubber material delimited by lateral surfaces and by two main surfaces, one of which, referred to as the tread surface, is intended to come into contact with a road surface when the tire is being driven on.

The "sidewall" of a tire means a lateral surface of the tire, said surface being disposed between the tread of the tire and a bead of this tire.

A "texture" means an organized arrangement of a plurality of elements, all or some of the elements in the arrangement being the repetition of one and the same basic element, for example a strand or a lamella.

A "strand" means a filiform element, the height of which is at least equal to twice the diameter of a disc having the same surface area as the mean cross section of the strand.

"Lamellae" means elongate strands which have a length at least equal to twice their height.

"Lightness" or "luminance" means the parameter which characterizes a surface to reflect light to a greater or lesser extent. Lightness is expressed using a scale that ranges from 0 to 100 according to the L*a*b* colour model established by the CIE (International Commission on Illumination) in 1976. The value 100 represents white or total reflection; the value 0 represents black or total absorption. In this colour model, a* and b* are chromaticity coordinates. The L*a*b* colour model also defines a chromaticity diagram. In this diagram, a* and b* indicate the direction of the colours: +a* goes towards red, −a* towards green, +b* towards yellow, and −b* towards blue. The centre of the diagram is achromatic. Saturation increases as the values a* and b* rise and thus with increasing distance from the centre of the diagram.

BRIEF DESCRIPTION OF THE DRAWINGS

Details of embodiments are given in the description which follows, which is supplemented by FIGS. 1 to 11, which are given solely by way of non-limiting examples and in which.

DETAILED DESCRIPTION OF THE DRAWINGS

Figure 1:
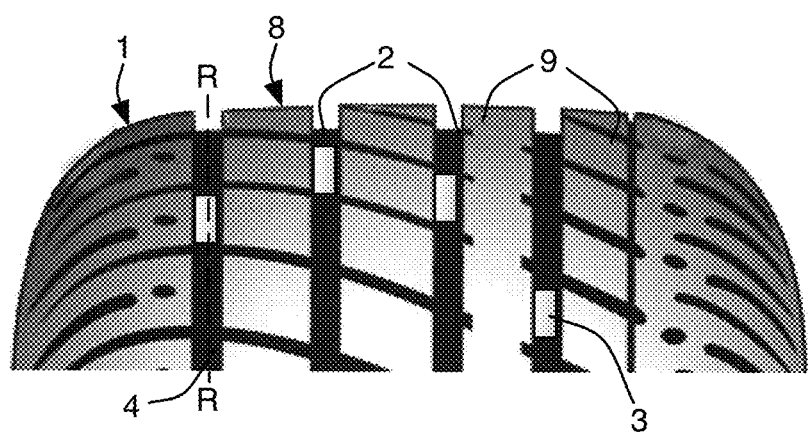
FIG. 1 is a partial view of a tread of a tire according to an embodiment of the invention.

FIG. 1 is a schematic depiction of a portion of a tread 8 of a tire 1. The tread 8 provides a surface for contact with the ground that is made up of tops 9 of tread patterns. The bottoms 10 of tread patterns of the tire 1 form grooves 2 or furrows. The grooves 2 act as housings for positioning the wear indicators 3. The grooves 2 can also be arranged in different ways in order to comply with specific functions. In the example illustrated, the grooves 2 are circumferential and provided with textures 4 at the groove bottoms 10. Such a covering has numerous functional and visual advantages. However, it is likely to affect the visibility of the wear indicators 3. Therefore, according to the invention, and as illustrated, the wear indicators 3, in particular the contact faces 7 of the wear indicators, are advantageously texture-free and have a surface that produces a contrast in lightness with the adjacent surface of the textured furrows. The contrast effect between the bottom of the furrows and the wear indicators 3 allows the latter to be made clearly visible, making it easier to locate them. Such a feature is particularly advantageous when the tread 8 is in a context in which visibility is limited.

Figure 2:
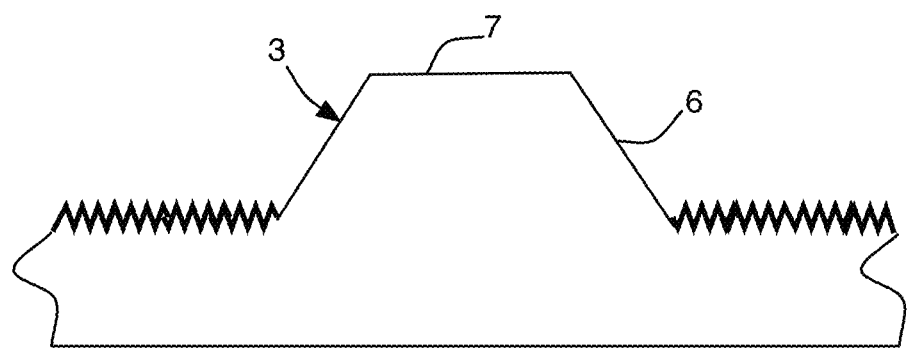
FIG. 2 is a cross-sectional view of an example of a wear indicator according to an embodiment of the invention.

As illustrated in FIG. 2, the texture-free wear indicator 3 is arranged in a groove 2 provided with a texture 4. The lack of texture on the wear indicator 3 makes it possible to create an accentuated contrast with respect to the textured groove 2.

Figure 3:
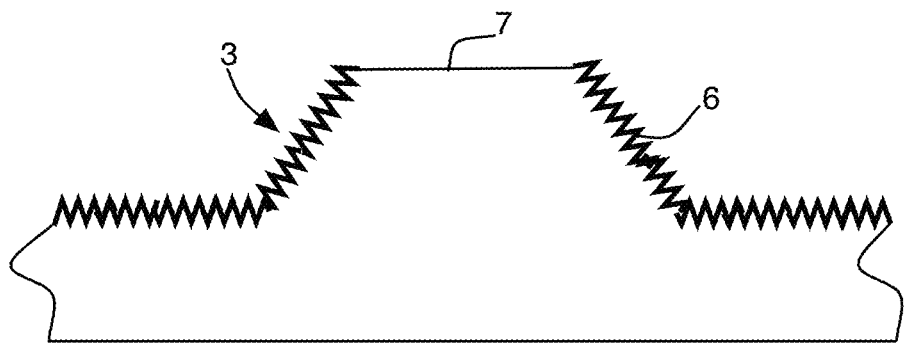
FIG. 3 is a cross-sectional view of a variant embodiment of the wear indicator from FIG. 2.

A wear indicator 3 may have textured surfaces, such as a lateral face 6, for example. FIG. 3 illustrates such an exemplary embodiment. However, it is preferable for the contact face 7 (or functional part) of the wear indicator to be texture-free such that the contrast with the texture 4 of the groove is accentuated. The integration of texture-free wear indicators 3 into textured grooves 4 has the effect of accentuating the visibility of the wear indicators 3 by contrast effects, notably lightness. The wear indicators 3 are thus more clearly visible.

The abovementioned contrast effect arises from the fact that the lightness of the zones provided with textures is less than that of the texture-free zones. Various arrangements or configurations of textures 4 make it possible to produce such an effect, as described below in relation to FIGS. 6 to 11.

The appropriate appliance for measuring the lightness is a Konica-Minolta CM 700D spectrocolorimeter (registered trade mark). This appliance is suitable for measuring:

the lightness L*1, L*2 of the zones of the groove (zones covered with the texture, zones not covered with the texture);

a component a* which defines a first colour shade between red and green;

a component b* which defines a second colour shade between yellow and blue.

Said appliance is positioned on the part of the tire to be measured and said appliance gives the values of the three parameters L*, a* and b* relative to the texture. These measurements are taken notably using the "SCI" (specular component included) mode, set at an angle of 10° and with a D65 type light setting (setting as defined by the International Commission on Illumination, CIE). By virtue of this appliance, the lightness of the textures of the groove 4 is measured, this then being compared with the lightness of the texture-free parts of the wear indicator.

The arrangement that promotes the visibility of the wear indicators 3 at the bottom of the groove 4 described above can advantageously be used for any type of tire 1.

Figure 4:
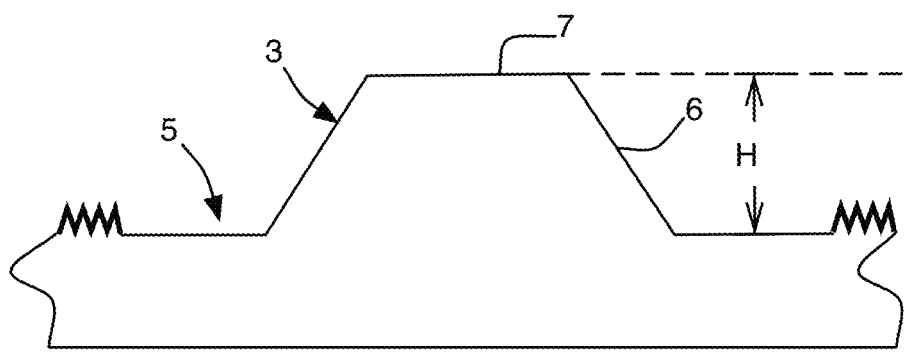
FIGS. 4 and 5 are cross-sectional views of two examples of texture-free wear indicators that are surrounded by measuring zones that are likewise texture-free, inserted within a textured groove.
Figure 5:
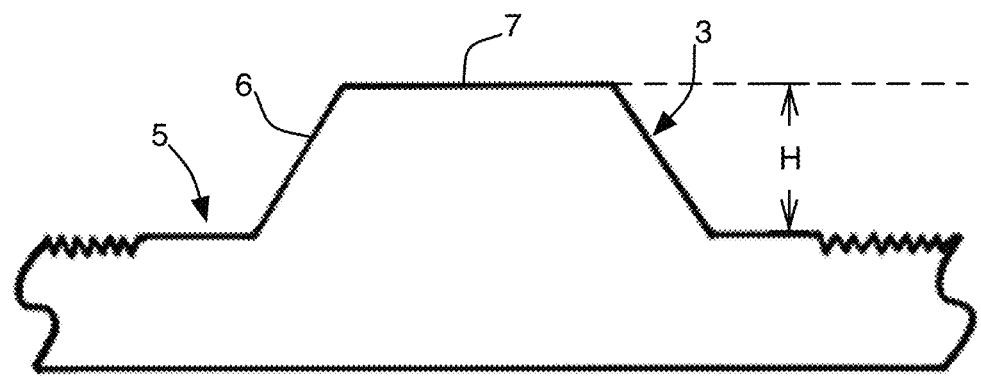

FIGS. 4 and 5 illustrate schematic cross-sectional depictions of another embodiment of the wear indicators 3 according to the invention. Texture-free zones 5 are left clear in the immediate vicinity of the wear indicator 3 in order to make it possible to very precisely measure the height H of the latter reliably and repetitively during a step of checking the wear indicator during the process of manufacturing the tire. In the exemplary embodiment in FIG. 4, the base of the textures in the bottom of the groove 10 is situated in the same radial position as the measuring zone 5 adjoining the wear indicator 3. In the example in FIG. 5, the tops of the textures in the groove are situated in the same radial position as the measuring zone 5 adjoining the wear indicator 3. In these two exemplary embodiments, the measuring zone is substantially flat and texture-free.

FIGS. 6 to 11 illustrate examples of textures 4 that can be disposed in the groove 2 according to the invention.

Figure 6:
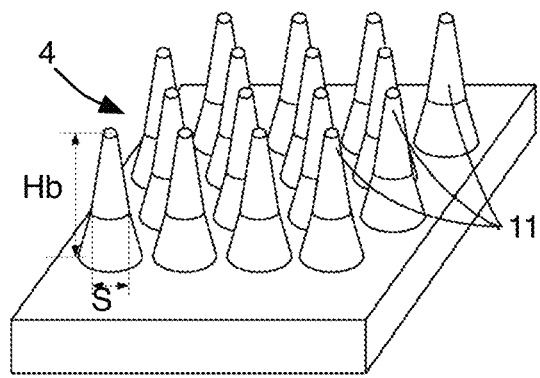
FIG. 6 shows a part of the texture of the groove according to a first exemplary embodiment in which the texture has protruding elements in the form of strands.

FIG. 6 illustrates an embodiment in which the texture has a plurality of strands 11. The strands 11 are distributed through the texture at a density at least equal to one strand per mm$^2$, each strand having a mean cross section S of between 0.0005 mm$^2$ and 1 mm$^2$. It will be noted that the mean cross section of each strand corresponds to the mean of the cross sections S measured at regular intervals from the base of the strand. The strands have a conical overall shape with a cross section that decreases over the height Hb of these strands.

Figure 7:
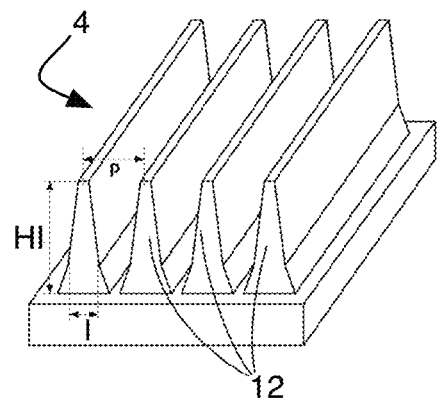
FIG. 7 shows a part of the texture of the groove according to a second exemplary embodiment in which the texture has protruding elements in the form of lamellae.

FIG. 7 illustrates an embodiment in which the texture has a plurality of mutually parallel blades 12, the spacing of the blades 12 in the texture being at most equal to 0.5 mm, each blade 12 having a mean width of between 0.02 mm and 0.5 mm. It will be noted that the mean width corresponds to the mean of the widths I measured at regular intervals over the height HI of the blade, the height of each blade being between 0.05 and 0.5 mm.

In another variant embodiment, the texture has a combination of strands 11 and/or blades 12.

The invention is not limited to the examples described and shown and various modifications can be made thereto without departing from its scope. Thus, according to another non-limiting variant embodiment, the blades 12 from FIG. 7 can be discontinuous. They have a flat part between one another. They can also have cross-sectional differences between one another. In addition, the blades can have curves or angles, notably along their length. They can also have a variable length.

Figure 8:
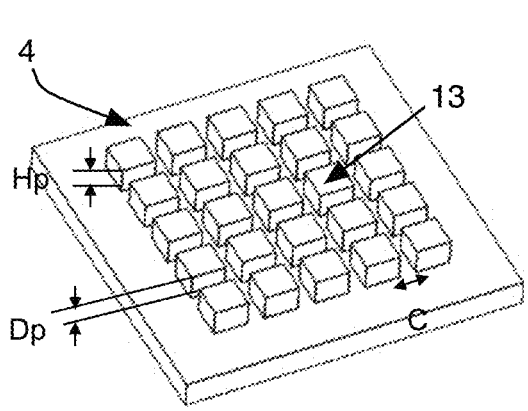
FIG. 8 shows a part of the texture of the groove according to a third exemplary embodiment in which the texture has protruding elements in the form of parallelepipeds.

In the example in FIG. 8, the textures have a parallelepipedal cross section 13 having a side length C of between 0.05 mm and 0.5 mm and a height Hp of between 0.05 mm and 0.5 mm, the distance Dp between two adjacent cavities in the texture being between 0.05 mm and 0.5 mm. Alternatively, the cross section of the textures may be circular, polygonal (for example hexagonal). With the square or polygonal structures, it is possible to more easily organize the elements with respect to one another so as to limit the surface area of the intermediate zones between the elements.

Figure 9:
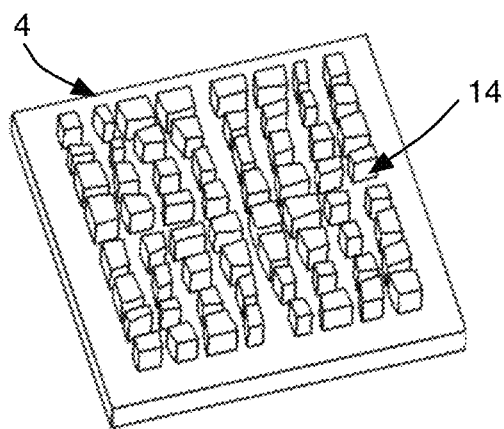
FIG. 9 shows a part of the texture of the groove according to a fourth exemplary embodiment in which the texture has protruding elements in which the shapes and the distances between protruding elements are variable.

In the variant in FIG. 9, the elements 14 have mutually variable shapes and distances. This variant makes it possible to render the details of the texture 4 less visible.

Figure 10:
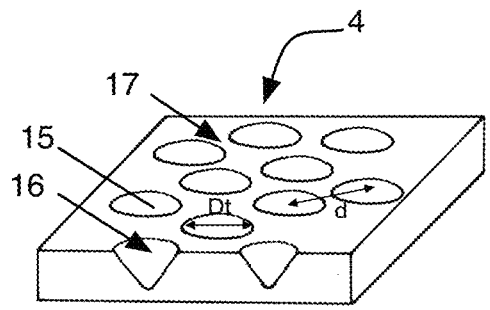
FIG. 10 shows a part of the texture of the groove according to a fifth exemplary embodiment in which the texture has recessed elements which are conical in this example.

FIG. 10 illustrates a texture according to another non-limiting variant embodiment. In this variant, the texture is formed by a plurality of cavities 16. The cavities 16 are in this case in the form of cones which extend into the depth of the surface and open onto this surface, forming circular openings 15. The cavities 16 thus have a cross section which decreases with depth. It will be noted that, in this variant, the openings 15 of the cavities 16 are not in contact. The openings 15 are separated by intermediate zones 17. Moreover, the openings 15 are distributed regularly such that the distance d between each opening 15 is similar overall.

Figure 11:
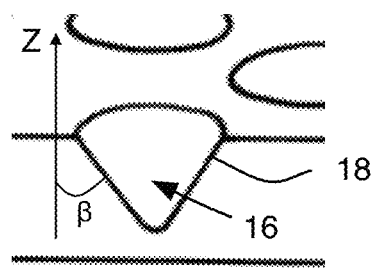
FIG. 11 shows an enlarged view of a cavity of a recessed element of the texture from FIG. 10.

FIG. 11 is an enlarged view of the texture in FIG. 10. In this case, all or some of the cavities have at least one wall 18 which, in cross section, forms an angle β of between 10° and 60° with respect to a direction Z perpendicular to the texture.

The figures and their descriptions given above illustrate the invention rather than limit it.

The reference signs in the claims are entirely non-limiting. The verbs "comprise" and "have" do not exclude the presence of elements other than those listed in the claims.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire comprising a tread, the tire comprising at least one groove, at least one wear indicator disposed in the groove, the wear indicator comprising a contact face adapted to come into contact with a roadway when the tire reaches a wear limit, wherein the groove comprises a texture produced integrally with a bottom of said groove, said texture being an organized arrangement of a plurality of texture elements, all or some of the texture elements of the arrangement being the repetition of a single base element, said texture surrounding the wear indicator and contrasting with the contact face of the wear indicator, wherein the texture has a first lightness (L*1) and the contact face of the wear indicator has a second lightness (L*2), brighter than the first lightness (L*1), wherein the difference in lightness between the first lightness and the second lightness is at least 5 units of lightness, wherein the wear indicator has a base at a radial position of the bottom of the groove, and wherein the bottom of the groove has a texture-free measuring zone disposed between a zone provided with said texture and the base of said wear indicator, wherein the radial position of the entirety of the texture-free zone is the same radial position as that of the base of the wear indicator and as that of the tops of the texture elements, such that none of the texture elements radially protrude above the radial position of the base of the wear indicator.

2. The tire according to claim 1, wherein the first lightness (L*1) is between 5 and 18 units.

3. The tire according to claim 1, wherein the lightness of the contact face is between 20 and 35 units.

4. The tire according to claim 1, wherein the wear indicator comprises at least one lateral face connecting the contact face of the wear indicator to said bottom, said lateral face not having said texture.

5. The tire according to claim 4, wherein the texture-free zone has a length of between 3 and 10 mm.

6. The tire according to claim 1, wherein the texture comprises a plurality of strands, said strands being distributed through the texture at a density at least equal to one strand per $mm^2$, each of said strands having a mean cross section S of between $0.0005$ $mm^2$ and $1$ $mm^2$.

7. The tire according to claim 1, wherein the texture comprises a plurality of mutually parallel blades, the spacing of the blades in the texture being at most equal to 0.5 mm, each said blade having a mean width of between 0.02 mm and 0.5 mm.

8. The tire according to claim 1, wherein the textures have a parallelepipedal cross section with a side length C of between 0.05 mm and 0.5 mm and a height Hp of between 0.05 mm and 0.5 mm.

9. The tire according to claim 1, wherein the texture is formed by a plurality of cavities, said cavities being in the form of cones, said cavities extending into the depth of the surface and opening onto said surface, forming circular openings.

10. The tire according to claim 1, wherein the first lightness (L*1) is between 8 and 16 units.

\* \* \* \* \*